United States Patent Office 3,265,642
Patented August 9, 1966

3,265,642
METHOD OF MANUFACTURING EXPANDABLE SYNTHETIC RESINS
Itaru Hatano and Kazuya Senuma, Kobe, Japan, assignors to Kanegafuchi Chemical Industry Company, Limited, Osaka, Japan, a corporation of Japan
No Drawing. Filed Jan. 11, 1963, Ser. No. 250,778
Claims priority, application Japan, Jan. 23, 1962, 37/2,486
7 Claims. (Cl. 260—2.5)

This invention relates to improvements in the method of manufacturing expandable synthetic resins.

As is well known in the art, certain synthetic resins, such as polystyrene, are available in the form of small beads containing an expanding agent. When such beads are processed, they expand and knit together to form a unicellular foam product.

Two types of expanding agents have been used, namely, an expanding agent consisting of a volatile substance which is in liquid form at normal temperatures, and becomes a gaseous substance when heated; and an expanding agent which is in gaseous form at normal temperatures. Inasmuch as normally gaseous expanding agents have been found to be superior to others, our invention is primarily directed to methods of manufacturing expandable synthetic resins having a normally gaseous expanding agent.

The manufacture of expandable synthetic resins having a normally gaseous expanding agent is usually accomplished either by the polymerization of monomers in the presence of the gaseous expanding agent, or the forcing of the gaseous expanding agent into a polymer.

In such manufacture according to prior art methods, we discovered that no matter which of these methods of the introduction of the gaseous expanding agent was utilized, the beads taken out of the pressure system, in time, discharged the gaseous expanding agent contained in them, with the result that the same could not thereafter be used in the making of a satisfactory foam product. We discovered that this was due to the fact that the expandable synthetic resin did not include means for retaining the gaseous expanding agent in the beads.

Previously proposed manufacturing processes endeavored to overcome this problem of gaseous discharge from the beads by the addition of a solvent or a plasticizer having an affinity for the base resin of the beads.

However, if such solvent or plasticizer is used in the method which provides for the polymerization of monomers in the presence of the gaseous expanding agent, the addition of such solvent or plasticizer retards the speed of polymerization and the polymer radicals under polymerization tend to cause a chain transfer because of the affinity agent, thus making it difficult for the expandable beads obtained to attain optimum polymerization. In addition, other quality characteristics of the expandable synthetic resin will be deteriorated. For instance these solvent or plasticizer affinity agents are likely to corrode the cells of the expanded material obtained, with the result that the ultimate foam product will have a non-uniform and rough cellular formation.

If, on the other hand, such solvent or plasticizer is used in the method which provides for the forcing of the gaseous expanding agent into the polymer, it necessarily follows that the gaseous expanding agent must be absorbed into the polymer beads after they have been swollen by means of the solvent or plasticizer. It is virtually impossible to obtain a uniform product using this method because the solvent and the expanding agent will not penetrate the beads uniformly. Use of this method usually results in a bead having an unexpanded central portion, forming a hard core unpermeated by the expanding agent. This will thus reduce the expanding capacity of the beads as a whole, with a resultant non-uniform product.

In short, all of the previously provided processes utilizing a normally gaseous expanding agent have been found to possess serious disadvantages.

There is thus a great demand for expandable synthetic resins of optimum quality, capable of storing a normally gaseous expanding agent in a stabilized state, without the use of additives which will react unfavorably with the base resin.

The primary object of this invention is to provide an expandable synthetic resin which will meet this demand.

Our invention basically provides a method of manufacture of expandable synthetic resins which includes the suspension polymerization, under pressure, of an ethylenically unsaturated organic monomer in the presence of a normally gaseous expanding agent and a nitrite. Our manufacturing method resolves the difficulties of the previously proposed methods.

Our method is generally carried out as follows:

Any suitable ethylenically unsaturated monomer may be used in practicing our method. For example, styrene, methyl methacrylate, or alpha-methyl styrene, either singly or in mixture may be used. The type of monomer or monomers selected will be determined according to the desired type and quality of the foam product to be produced, economic factors, marketability, and other conditions, as is well known in the art.

Any normally gaseous expanding agent may be utilized in the practicing of our invention. For example, chemically inert gases such as hydrocarbon gases, including butane, ethane, propane, methane, butene, isobutylene, propylene, and ethylene; halogenated hydrocarbon gases including methyl chloride; and chemically inert gases such as nitrogen and carbon dioxide. Of the examples given, butane and propane have been found to be especially effective. It is, of course, possible to use such expanding agents either singly or in mixture, as is well known in the art. Which of the expanding agents to use, and whether to use only a single expanding agent or a mixture of them will be determined by the consideration of the various factors, such as economy, the intended quality of the expanded product to be obtained, the conditions of polymerization, etc., as is well known in the art.

The quantity of expanding agents which will be used is directly proportional to the quality of monomer. For the practicing of our invention, we preferably use an expanding agent in the range of from 3% to 15% by weight of the total quantity of the monomer. For example, if 1000 grams of monomer is used, our invention contemplates the use or from 30 grams to 150 grams of normally gaseous expanding agent. The quantity of expanding agent will be determined by consideration of the desired quality of the expanded product to be obtained, conditions of polymerization, etc., as is well known in the art.

Nitrite has a polymerization inhibitive property and various types may be used in the practicing of our invention. We have discovered that nitrites which are soluble in water are particularly desirable, for example, sodium nitrite and potassium nitrite. A single nitrite, or a mixture of two or more nitrites may be used. The quantity of nitrite will depend on the conditions of polymerization, the type of monomer employed, the temperature, the type and amount of catalyzer used, the desired quality of the expanded product, and the price range of the expanded product. We preferably utilize nitrite in the range of from 0.0001% to 0.15% by weight of the total quantity of monomer. For example, if 1,000 grams of monomer is used, our invention contemplates the use of from 1 to 1500 milligrams of nitrite.

Any catalyst commonly used in suspension polymerization processes may be used. The quantity of catalyst will depend upon the type of monomer, the conditions of polymerization, the type of catalyst, etc. as is well known in the art. For the practice of our invention, we preferably use a catalyst of 1% or less, by weight, of the total monomer. For example, if 1,000 grams of monomer is used, our invention contemplates the use of from a trace to 10 grams of catalyst.

The charging of the monomer, the expanding agent, the nitrite, the catalyst, and water, may be accomplished in any well known manner. The expanding agent may be added either before or during the process of polymerization, or both before and during polymerization.

Polymerization is preferably carried out by the suspension process. The use of the suspension polymerization method provides an optimum bead diameter of from 0.5 mm. to 5.0 mm. This range of bead diameter is desirable inasmuch as a bead diameter of less than 0.5 mm. will result in substantially reduced expansion, while a bead diameter larger than 5.0 mm. will not provide a foam product of a fine, uniform quality. This is due to the fact that the expansibility of the expendable beads depends on the bead diameter. The suspension polymerization process is desirable inasmuch as the desired bead diameter may be obtained by regulating the amount of the dispersing agent used, the conditions of agitation and the ratio between the water and monomer, without resorting to other means of granulation, as is well known in the art.

Emulsion polymerization will usually not provide optimum bead diameter, and for that reason suspension polymerization is preferably utilized in connection with our invention.

In order to promote the dissolution of the expanding agent in the monomer, it is desirable that polymerization be carried out under pressure. The required pressure in the system will differ according to the conditions of polymerization and the type of expanding agent used, as is well known in the art. For instance, a pressure of approximately 3 to 15 atmospheres will be acceptable in the case of butane, and a pressure of from 5 to 20 atmospheres has been found to be suitable in the case of propane. Accordingly, in executing the method of our invention, the applied pressure under which the method is carried out will be dependent upon the type of expanding agent and the conditions of polymerization.

The time and temperature requirements for polymerization under the terms of this invention is similar to that required in the ordinary suspension method of polymerization.

Polymerization will be carried out in such a way as to give the desired degree of polymerization, as is well known in the art.

As is well known, the expansibility of the beads is directly proportional to the amount of the expanding agent contained inside of the beads. We further discovered that the expansibility of the beads depends, in virtually direct proportion, on the residual amount of the base momener in the beads. We determined this fact by charging, in a sealed tube, 100 parts styrene, 0.3 parts benzoyl peroxide, 0.2 parts polyvinyl alcohol, 12 parts butane, and 100 parts of water, and carrying out a suspension polymerization method of a shaking type. The polymer obtained was then dissolved, and the residual amount of monomer of styrene was determined by the ultra-violet ray absorption spectrum method. The method of determination of the degree of expansion was in accordance with JIS-A-9511, with the following results:

TABLE 1.—RELATIONSHIP BETWEEN THE RESIDUAL MONOMER AND THE DEGREE OF EXPANSION

| Residual monomer (percent) | Degree of Expansion (cc./10 g.) |
|---|---|
| 0.4 | 360 |
| 0.6 | 450 |
| 0.8 | 700 |
| 1.0 | 750 |
| 1.2 | 740 |
| 1.4 | 750 |

In view of the fact that a residual of monomer in the beads is desirable in order to provide maximum expansibility of the beads, it seemed to us desirable to provide for a residual monomer in the beads during polymerization. We discovered that nitrite increased the amount of residual monomer in the beads. We further discovered that the amount of expanding agent absorbed and retained in the beads was directly proportional to the residual monomer in the beads. This was determined by charging 100 parts styrene, 0.2 part benzoyl peroxide, 0.2 part polyvinyl alcohol, 5 parts propane, and 100 parts water in a sealed tube, and carrying out suspension polymerization of the shaking type, with various amounts of sodium nitrite being added. This produced the following result:

TABLE 2.—RESIDUAL EFFECT OF MONOMER BY USING NITRITE

| Sodium nitrite (Parts) | Inversing ratio to polymer (percent) | Amount of residual monomer in beads (percent) |
|---|---|---|
| 0.040 | 87.3 | 12.5 |
| 0.030 | 88.4 | 11.1 |
| 0.010 | 93.8 | 5.3 |
| 0.005 | 96.4 | 2.9 |
| 0.001 | 99.1 | 0.5 |
| 0 | 100.0 | 0 |

The residual effect of the monomer in the use of nitrite, under conditions of different temperatures and times of polymerization, were determined by charging 100 parts styrene, 0.3 part benzoyl peroxide, 0.2 part polyvinyl alcohol, 200 parts of water, 0.018 part of sodium nitrite, and 6 parts of butane gas in sealed tube and carrying out suspension polymerization of the shaking type. The duration and temperature of polymerization were varied, the contents were taken out and the yield of polymerization was measured by weight, and the residual amount of styrene measured by the ultra-violet ray absorption spectrum method, with the following results:

TABLE 3.—RESIDUAL EFFECT OF MONOMER BY USING NITRITE

| Condition of polymerization | Inversing ratio to polymer (percent) | Residual of monomer in beads (percent) |
|---|---|---|
| 82° C. × 30 hours | 97.9 | 1.8 |
| Do | 97.9 | 1.7 |
| Do | 97.7 | 1.9 |
| 82° C. × 30 hours + 90° C. × 10 hours + 98° C. × 10 hours | 97.8 | 1.8 |
| Do | 97.8 | 1.7 |
| Do | 97.6 | 1.8 |

The relationship between the residual amount of monomer and the amount of expanding agent retained in the beads was determined by the carrying out suspension polymerization with 100 parts styrene, 0.3 part benzoyl peroxide, 0.25 part polyvinylpyrrolidone and 200 parts water with the addition of nitrite changed as shown in the following table. At the point where the residual amount of monomer in the beads reached 3%, butane gas (12 parts) was forced in, and its absorption was checked at 90° C. The results obtained are as follows:

TABLE 4.—RELATIONSHIP BETWEEN THE RESIDUAL AMOUNT OF MONOMER AND THE AMOUNT OF EXPANDING AGENT RETAINED USING NITRITE

| Amount of sodium nitrite (parts) | | Duration of treatment (hrs.) | | | | |
|---|---|---|---|---|---|---|
| | | 0 | 1 | 2 | 4 | 7 |
| 0 | Amount of butane absorbed by beads (percent) | ------ | 5.0 | 5.0 | 4.5 | 3.5 |
| | Amount of residue of monomer in beads (percent) | 3.1 | 1.6 | 0.9 | 0.3 | 0 |
| 0.007 | Amount of butane absorbed by beads (percent) | ------ | 5.7 | 6.1 | 5.8 | 5.8 |
| | Amount of residue of monomer in beads (percent) | 3.1 | 2.0 | 1.5 | 1.1 | 1.1 |
| 0.0085 | Amount of butane absorbed by beads (percent) | ------ | 6.3 | 6.7 | 6.7 | 6.7 |
| | Amount of residue of monomer in beads (percent) | 3.5 | 2.8 | 2.4 | 2.2 | 2.2 |

For comparative analysis we charged 100 parts styrene, 0.27 part benzoyl peroxide, 0.175 part polyvinylpyrrolidone, and 200 parts water in a sealed tube, and carried out suspension polymerization, with the following results:

TABLE 5.—RESIDUAL MONOMER WITHOUT USING NITRITE

| Experiment No. | Duration of polymerization (hr.) | Residual amount of monomer (percent) |
|---|---|---|
| 1 | 14 | 2.0 |
| 2 | 14 | 1.1 |
| 3 | 14 | 1.6 |
| 4 | 14 | 1.9 |

It is to be particularly noted that the quantity of nitrite used in our polymerization process should be held within the range of 0.0001 to 0.15% by weight of the monomer. If less than 0.0001% by weight is used, it will have little or no effect on retention of residue monomer in the beads. If, on the other hand, the nitrite exceeds 0.15%, the power of retention is excessive, with the result that the residual amount of monomer is excessively large and thus, when the beads obtained are expanded under heating, the foam product resulting therefrom tends to be of a poor quality because the foam cells in it are liable to rupture due to the softening temperature of the base material being excessively low. For these reasons, the quantity of nitrite should be neither above nor below the prescribed range.

We discovered that nitrite is an ideal polymerization inhibitive agent for use in our invention. This is due to the fact that, when nitrite is used, the residual amount of monomer can be adjusted to the desired value, and the nitrite contributes to the formation of the desired bead diameter.

In order to provide a comparative analysis of inhibitive agents, various inhibitive agents were individually added to 100 parts styrene, 0.3 part benzoyl peroxide, 0.25 part polyvinylpyrrolidone, and 200 parts water, and suspension polymerization was carried out. Midway in the course of polymerization, 12 parts butane gas was added. These experiments were carried out at 90° over eight hours, and subsequently at 96° C. for 6 hours. The turbidity of the water in the system was measured by the use of a relative turbidity titrating device. The relationship between the inhibitive effect and the turbidity, or the significance of turbidity, is shown by the degree or extent of the turbidity of the water solution remaining after the beads produced are separated from the slurry after the completion of polymerization. This is a well known and widely used means of assessing the polymerization inhibitive effect in water. Relationship between these various polymerization inhibitive agents was as follows:

TABLE 6.—WATER-SOLUBLE POLYMERIZATION INHIBITIVE AGENTS AND THEIR MONOMER RETAINING AND POLYMERIZATION INHIBITIVE EFFECTS

| Kind of inhibitive agent | Amount (percent) | Residual amount of monomer in beads (mm.) | Average grain diameter of beads (mm.) | Polymerization inhibitive effect (turbidity) |
|---|---|---|---|---|
| None used | .0 | 0.5 | 3.5 | 100 |
| Sodium nitrite | 0.0035 | 1.6 | 1.4 | 15.7 |
| Do | 0.007 | 2.7 | 1.4 | 11.3 |
| Copper sulfate plus acetic acid (Equal mol to 0.0035 of NaNO₂) | 0.0127+0.127 | 0.4 | 3.0 | 57.9 |
| Copper sulfate plus acetic acid (Equal mol to 0.007 of NaNO₂) | 0.253+0.253 | 0.5 | 3.1 | 56.3 |
| Ammonium rhodanide (Equal mol to 0.0035 of NaNO₂) | 0.0039 | 0.5 | 3.1 | 74.3 |
| Ammonium rhodanide (Equal mol to 0.007 of NaNO₂) | 0.0077 | 0.6 | 3.1 | 72.2 |

It was further determined that the addition of nitrite, so long as it remained within the prescribed range, did not exert any substantial effect on the speed of polymerization. Furthermore, the presence of the expandable gas in the system did not bring about any substantial difficulties. To prove this fact, we charged 100 parts styrene, 0.3 part benzoyl peroxide, 0.225 part polyvinylpyrrolidone, 0.025 part polyvinyl alcohol and 100 parts water, together with the additive, in a sealed tube and subjected the same to polymerization at 90° C., measuring the yield of polymerization every two hours. Results obtained were as follows:

TABLE 7.—NITRITE, EXPANDING GAS, AND THE SPEED OF POLYMERIZATION

| Amount of sodium nitrite (percent) | Amount of butane (percent) | Inversing ratio to polymer (percent) | | | | |
|---|---|---|---|---|---|---|
| | | Duration of polymerization (hrs.) | | | | |
| | | 2 | 4 | 6 | 8 | 10 |
| 0 | 0 | 40.5 | 77.5 | 93.0 | 97.5 | 98.6 |
| 0.007 | 0 | 38.0 | 69.0 | 89.5 | 96.0 | 96.3 |
| 0 | 12 | 32.0 | 54.0 | 67.0 | 73.5 | 77.0 |
| 0.007 | 12 | 31.0 | 51.0 | 63.5 | 70.5 | 74.0 |

Since it is necessary to use only a small amount of nitrite in carrying out our invention, the same does not materially interfere with the degree of polymerization of the polymer produced. In proving this, suspension polymerization was carried out with 100 parts styrene, 0.5 part benzoyl peroxide, 0.14 part polyvinyl alcohol, 5 parts butane gas, and 100 parts water, with the amount of sodium nitrite being varied. An 0.3% toluene solution of the polymer thus obtained was prepared, and the viscosity of the solution measured, the results being as follows:

TABLE 8.—NITRITE AND DEGREE OF POLYMERIZATION

| Amount of sodium nitrite (percent) | Relative viscosity |
|---|---|
| 0 | 0.193 |
| 0.05 | 0.200 |
| 0.10 | 0.193 |
| 0.15 | 0.197 |

In carrying out our invention, we preferably utilize a quantity of expandable gas of from 3 to 15%, by weight, of the total amount of monomer. If less expanding gas is used, the expanding function of the beads will be weakened, and if an excessive amount of expanding gas is used, the expanding power will be too strong, with the result that the partitions of foam cells may be broken at the time of expanding treatment.

We further discovered that the higher the temperature and pressure of the polymerization, the faster the permeation of expanding gas to the central part of the beads. It is advisable to elevate the temperature (to raise the pressure) when the expanding agent is added in the latter period of polymerization. There is no appreciable variation in the amount of absorption of the gas by the beads regardless of the temperature and pressure so long as the temperature and pressure are within a suitable range. This relationship between the pressure and temperature was determined by the carrying out of suspension polymerization with 100 parts styrene, 0.3 part benzoyl peroxide, 0.18 part polyvinylpyrrolidone, 0.0035 part sodium nitrite and 100 parts water. At the point where the residual monomer inside the beads produced attained 2%, butane gas (12 parts) was forced in, and the amount of its absorption was measured with the pressure and time of treatment variously changed. Results obtained are as follows:

TABLE 9.—RELATIONSHIP OF THE PRESSURE AND TEMPERATURE TO THE ABSORPTION OF EXPANDING AGENT

| Pressure used in treatment (kg./cm.$^2$) | Temperature used in treatment (° C.) | Amount of absorption of butane | Duration of treatment (hrs.) | | | Time required for disappearance of hard core (hrs.) |
|---|---|---|---|---|---|---|
| | | | 1.5 | 4 | 6 | |
| 14.7 | 120 | Amount of absorption (percent) | 5.9 | 6.0 | 6.0 | 3 |
| 12.9 | 100 | | 6.0 | 6.1 | 6.1 | 6 |
| 11.0 | 90 | | 5.7 | 5.8 | 6.1 | 8 |

The foam product obtained by the practicing of this invention had stable cell partitions. Nitrite, by its nature, is incapable of corroding the base resin. The residual monomer which may corrode the base material is either converted to polymer through heat polymerization or eliminated out of the system when the beads are heated and expanded, and therefore is practically non-existent inside the expanded product. Thus, the foam cells do not contain any harmful substance that may attack them.

Since the suspension polymerization method is preferably employed, expandable beads of a desired bead diameter can be directly obtained, without using other means of granulation.

The expandable synthetic resin beads of our invention may be expanded by means of an extruder, a mold or other means, as is well known in the art. The beads may be heated up to an optimum temperature, either contained in a vessel which can be closed, but not hermetically sealed, or in any other suitable form of vessel. The optimum temperature depends on various factors such as the type of synthetic resin used as a base material, the degree of polymerization, the type of expanding agent, whether the container vessel is used or not, the shape of the vessel, the desired degree of expansion, etc., as is well known in the art. Generally, a satisfactory product will be obtained as long as the temperature is higher than the softening temperature of the base material composition. By heating, the base material composition is softened while the gas contained inside is expanded, and these two actions combine to bring about expansion. By cooling to a normal temperature, a final product may be obtained. Several specific examples of methods embodying our invention are as follows:

*Example 1*

1,100 g. styrene monomer, 3.3 g. benzoyl peroxide, and 3,300 g. aqueous solution of polyvinylpyrrolidone, wherein 77 mg. sodium nitrite is dissolved, were charged into an autoclave, and after deaeration, 70 g. butane gas were forced into the autoclave. While shaking the autoclave violently, the temperature was raised to 80° C. At this time the internal pressure was 2.5 atmospheres. The temperature was then maintained at 80° C. for 30 hours, and then raised to 90° C., and shaking continued for 10 hours to effect suspension polymerization. Subsequently, the temperature was lowered to an ordinary temperature, for cooling, and with shaking stopped, the contents of the autoclave were taken out and the beads were filtered out. These beads were dried at a relatively low temperature, and 95% of the beads were found to have a diameter of from 0.5 mm. to 5 mm. The amount of residual monomer in the beads was 1.1%.

The expandable beads thus obtained were subjected to pre-expansion in boiling water for 10 minutes, which resulted in a product of such a degree of expansion with 10 g. expanded to a volume of 530 cc. These grains of primary expansion were then charged into the mold to such an extent that the mold would be precisely full after secondary expansion, and were then molded under heating for 10 minutes at 10° C. The result obtained was a molded expanded product having a specific gravity of 0.018.

Example 2

20 kg. water containing 1 g. sodium nitrite and 25 g. polyvinyl alcohol, 7 kg. styrene, 3 kg. acrylonitrile, and 50 g. lauroyl peroxide were charged into an autoclave provided with an agitator having two turbine wings as well as a baffle plate. The autoclave was then deaerated, and filled with propane gas. Agitation was started at a speed of 350 revolutions per minute, and the suspension polymerization was conducted with the temperature inside the autoclave raised to 80° C. The internal pressure at that time was 7 atmospheres. Subsequently the temperature was raised to 110° C. Polymerization was continued at this temperature for 12 hours. Midway, at the third hour of the said 12 hours of polymerization, an additional 300 g. propane gas was forced in, and then cool water was circulated in the jacket to lower the internal temperature to normal. The contents were taken out and filtered. Expandable beads of 0.5 mm. to 5 mm. were obtained. The residual amount of monomer in the beads was 1.8%. These beads were directly expanded in the mold, whereby a molded expanded product having a degree of expansion of 620 cc. per 10 g. and a specific gravity of 0.025 was obtained.

Example 3

Using 1,000 g. methyl methacrylate, 3 g. benzoyl peroxide, 2 g. polyvinyl alcohol, 70 mg. sodium nitrite and 3,000 g. water, polymerization was carried out in a similar manner as Example 1, whereby expandable beads were obtained.

Example 4

30 g. benzoyl peroxide was dissolved in 10 kg. styrene. This was added into an autoclave containing 30 kg. water having 27 g. polyvinyl pyrrolidone and 0.7 g. sodium nitrite. Effective agitation was started. At the 14th hour of polymerization at 80° C., 1 kg. butane gas and 0.2 kg. propane gas were forced into the autoclave. Agitation was continued for 7 hours with temperature gradually elevated while the pressure was maintained at 11 kg./cm.$^2$. After cooling to normal temperature, expandable beads were obtained, and then washed with water and dried. These beads, of 10 to 30 meshes, were found to contain the absorbed mixture gas consisting of butane and propane, 6.8%, and 1.2% of styrene monomer. The relationship between the time and degree of expansion of these beads was examined at the expanding temperature according to JIS–A–9511, and the following results were shown:

TABLE 10.—RELATIONSHIP BETWEEN TIME AND DEGREE OF EXPANSION

| Time of Heating (min.) | 1 | 2 | 3 | 4 | 5 | 7 | 10 | 15 |
|---|---|---|---|---|---|---|---|---|
| Degree of expansion (cc./10 g.) | 410 | 520 | 560 | 640 | 680 | 720 | 700 | 690 |

It was thus shown that the degree of expansion will remain stable even when the time of heating is prolonged. This means a wide range of processing time and easy processibility of the product.

It is obvious that our invention is not limited to the specific examples herein enumerated.

Various changes may be made in the form of the invention herein described without departing from the spirit of the invention or the scope of the following claims.

We claim:

1. A method of manufacturing expandable synthetic resinous beads which includes the polymerization under pressure of a monomer selected from the group consisting of styrene, alpha-methyl styrene, methyl methacrylate, and mixtures of styrene, alpha-methyl styrene and methyl methacrylate in an aqueous suspension in the presence of a monomer soluble catalyzer, an expanding agent comprising a chemically inactive gas which is gaseous at atmospheric temperature and pressure, and a water soluble nitrite of from 0.0001% to 0.15% by weight of the total quantity of monomer, which water soluble nitrite is selected from the group consisting of sodium nitrite, potassium nitrite, and mixtures of sodium nitrite and potassium nitrite.

2. A method as specified in claim 1 wherein the chemically inactive gas consists of a hydrocarbon gas.

3. A method as specified in claim 1 wherein the chemically inactive gas consists of a halogenated hydrocarbon gas.

4. A method as specified in claim 1 wherein the chemically inactive gas consists of a chemically inert gas.

5. A method as specified in claim 1 wherein the expanding agent is from 3% to 15% by weight of the total quantity monomer.

6. A method of manufacturing expandable synthetic resinous beads which includes the polymerization under pressure of a monomer selected from the group consisting of styrene, alpha-methyl styrene, methyl methacrylate, and mixtures of styrene, alpha-methyl styrene and methyl methacrylate in an aqueous suspension in the presence of a monomer soluble catalyzer, an expanding agent which is gaseous at atmospheric temperature and pressure and comprises a gas selected from the group of gases consisting of butane, ethane, propane, methane, butene, isobutylene, propylene, ethylene, methyl chloride, nitrogen, carbon dioxide, and mixtures of butane, ethane, propane, methane, butene, isobutylene, propylene, ethylene, methyl chloride, nitrogen, and carbon dioxide, and a water soluble nitrite of from 0.0001% to 0.15% by weight of the total quantity of monomer, which water soluble nitrite is selected from the group consisting of sodium nitrite, potassium nitrite, and mixtures of sodium nitrite and potassium nitrite.

7. A method of manufacturing expandable synthetic resinous beads which includes the polymerization under pressure of a monomer selected from the group consisting of styrene, alpha-methyl styrene, methyl methacrylate, and mixtures of styrene, alpha-methyl styrene and methyl methacrylate in an aqueous suspension in the presence of a monomer soluble catalyzer, an expanding agent of from 3% to 15% by weight of the total quantity monomer, which expanding agent is gaseous at atmospheric temperature and pressure and comprises a gas selected from the group of gases consisting of butane, ethane, propane, methane, butene, isobutylene, propylene, ethylene, methyl chloride, nitrogen, carbon dioxide, and mixtures of butane, ethane, propane, methane, butene, isobutylene, propylene, ethylene, methyl chloride, nitrogen, and carbon dioxide, and a water soluble nitrite of from 0.0001% to 0.15% by weight of the total quantity of monomer, which water soluble nitrite is selected from the group consisting of sodium nitrite, potassium nitrite, and mixtures of sodium nitrite and potassium nitrite.

References Cited by the Examiner

UNITED STATES PATENTS

| 2,537,951 | 1/1951 | Amos | 260—2.5 |
| 2,744,291 | 5/1956 | Stastny et al. | 260—2.5 |
| 2,888,410 | 5/1959 | Buchholtz et al. | 260—2.5 |
| 2,893,963 | 7/1959 | Cleland et al. | 260—2.5 |
| 2,950,261 | 8/1960 | Buchholtz | 260—2.5 |

OTHER REFERENCES

Kharasch et al., Industrial and Engineering Chemistry, vol. 39, July–December 1947, pages 830–837.

MURRAY TILLMAN, *Primary Examiner.*

M. FOELAK, *Assistant Examiner.*

UNITED STATES PATENT OFFICE
CERTIFICATE OF CORRECTION

Patent No. 3,265,642                                August 9, 1966

Itaru Hatano et al.

It is hereby certified that error appears in the above numbered patent requiring correction and that the said Letters Patent should read as corrected below.

Column 3, line 37, for "expendable" read -- expandable --; columns 5 and 6, TABLE 4, fifth column, line 2 thereof, for "5.0" read -- 5.5 --; column 8, line 73, for "10°" read -- 110° --.

Signed and sealed this 1st day of August 1967.

(SEAL)
Attest:

Edward M. Fletcher, Jr.
Attesting Officer

EDWARD J. BRENNER
Commissioner of Patents